Aug. 23, 1938.  E. M. GLASGOW  2,128,135
ELECTRIC TROLLEY CONSTRUCTION
Filed Feb. 24, 1936  6 Sheets-Sheet 1
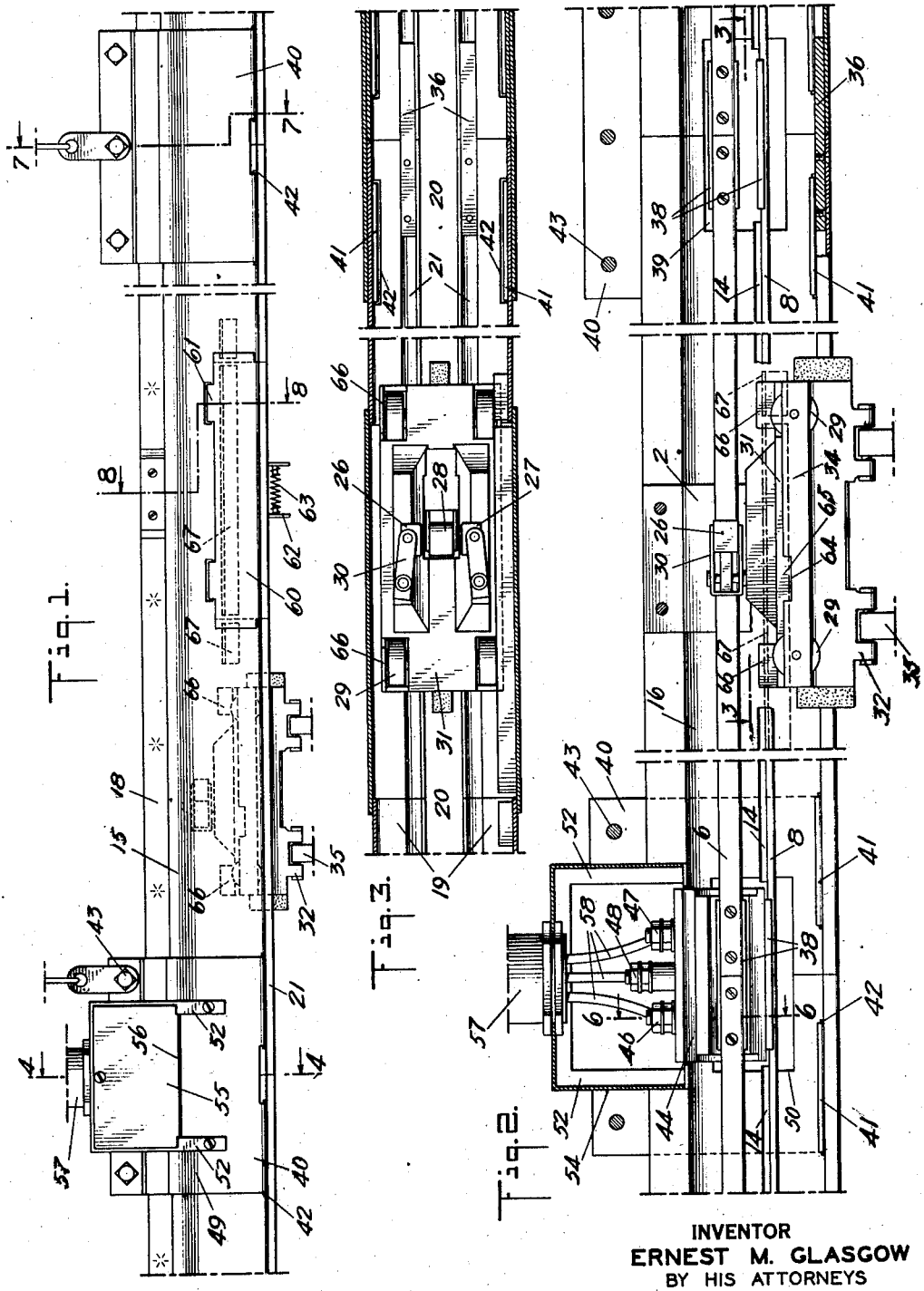
INVENTOR
ERNEST M. GLASGOW
BY HIS ATTORNEYS
Howson and Howson Aug. 23, 1938.  E. M. GLASGOW  2,128,135
ELECTRIC TROLLEY CONSTRUCTION
Filed Feb. 24, 1936  6 Sheets-Sheet 2
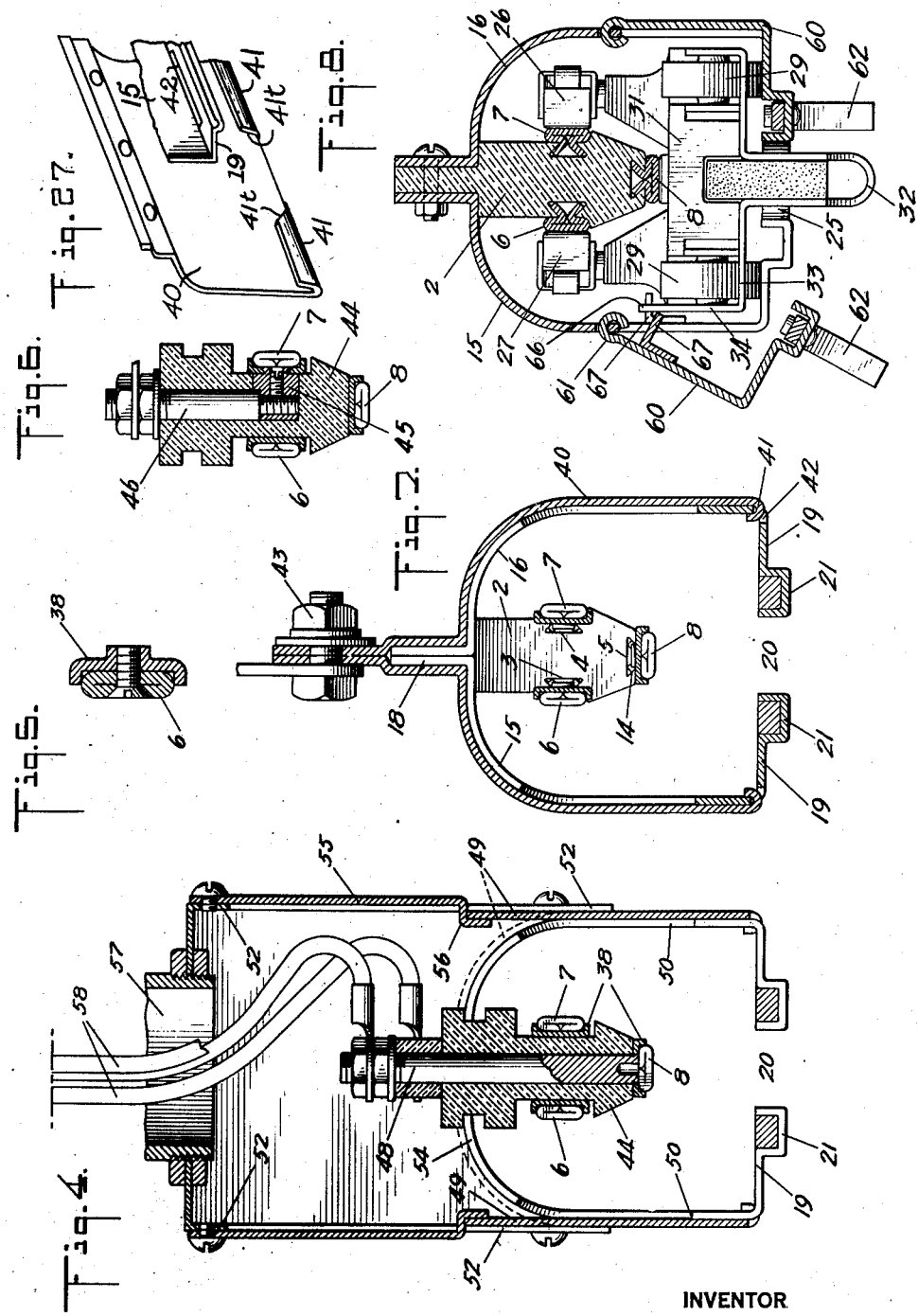
INVENTOR
ERNEST M. GLASGOW
BY HIS ATTORNEYS
Howson and Howson Aug. 23, 1938.     E. M. GLASGOW     2,128,135
ELECTRIC TROLLEY CONSTRUCTION
Filed Feb. 24, 1936     6 Sheets-Sheet 3
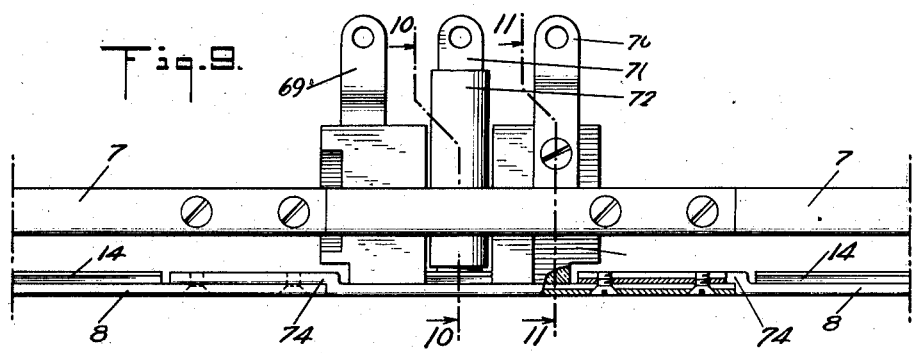
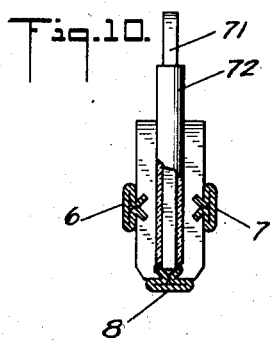
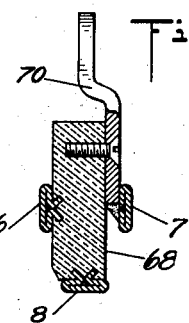
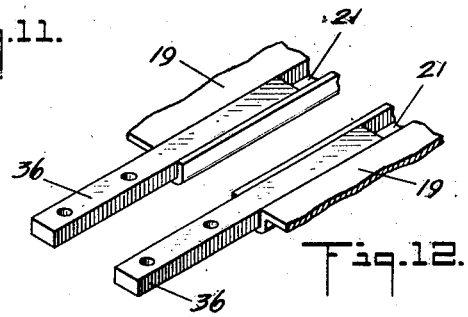
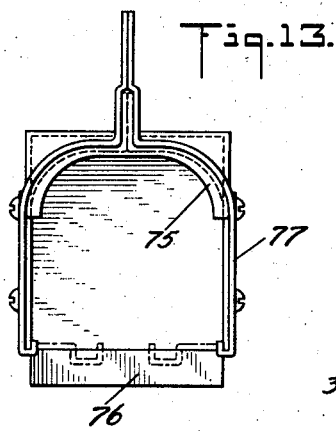
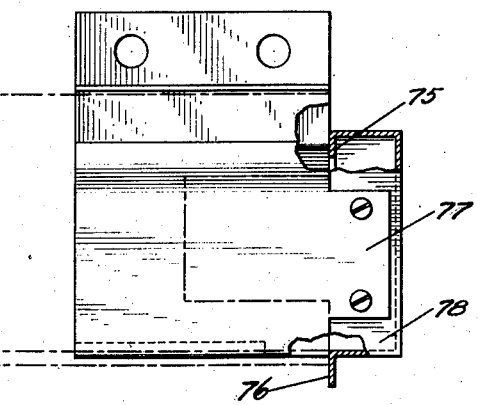
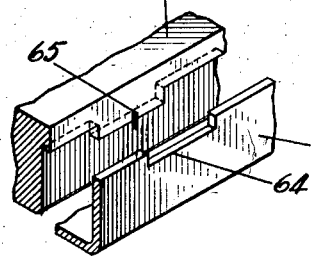
INVENTOR
ERNEST M. GLASGOW
BY HIS ATTORNEYS
Howson and Howson Aug. 23, 1938.  E. M. GLASGOW  2,128,135
ELECTRIC TROLLEY CONSTRUCTION
Filed Feb. 24, 1936  6 Sheets-Sheet 4
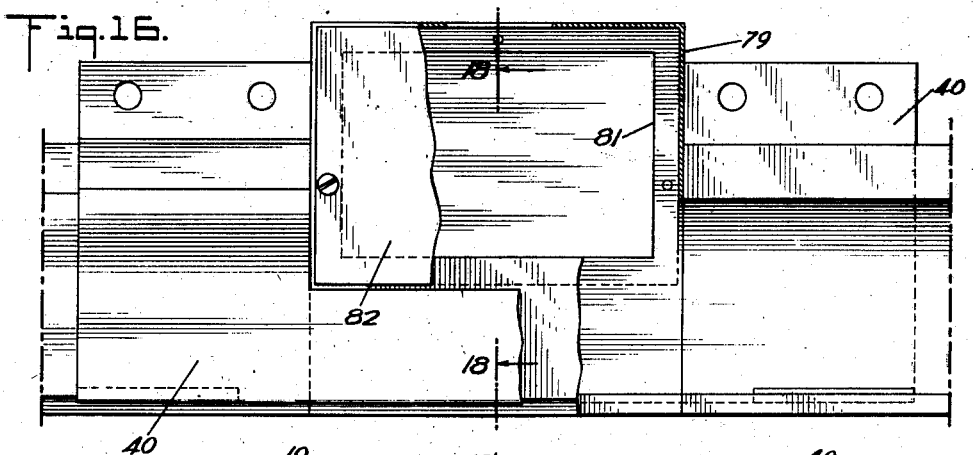
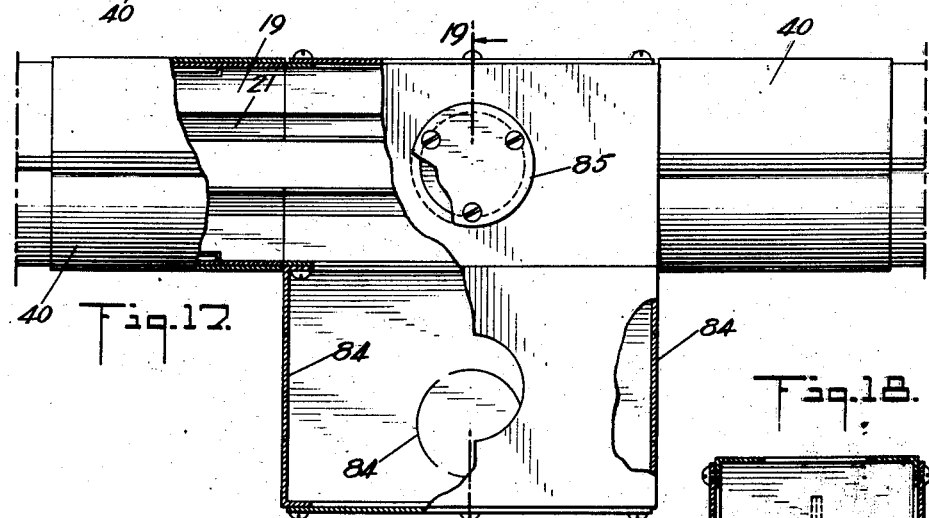
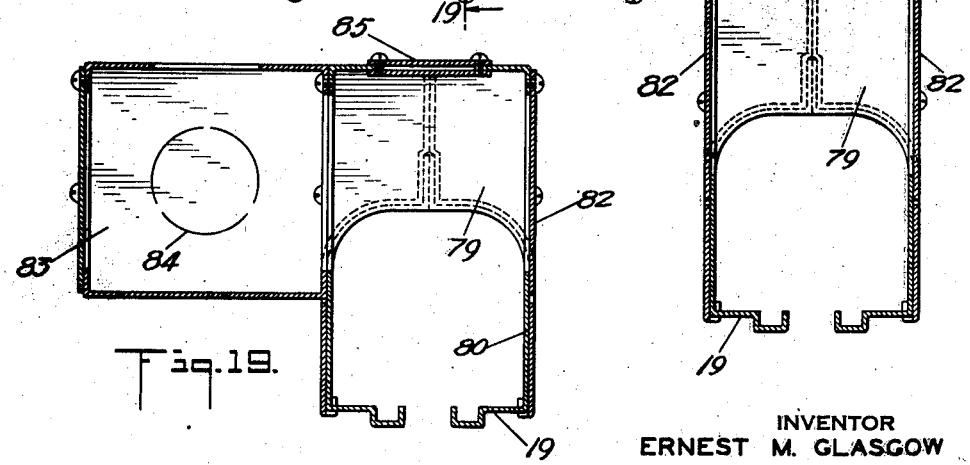
INVENTOR
ERNEST M. GLASGOW
BY HIS ATTORNEYS
Howson and Howson

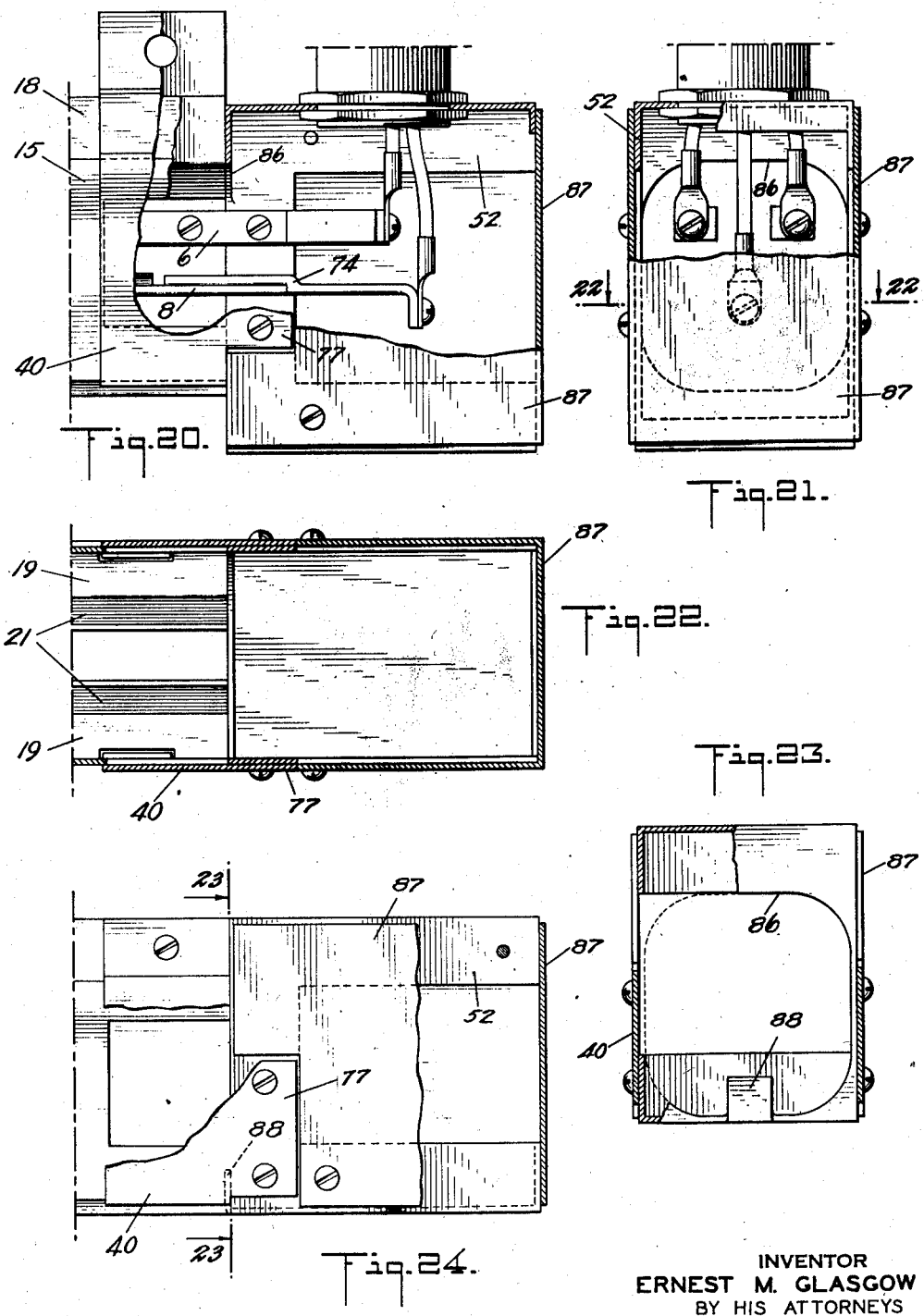

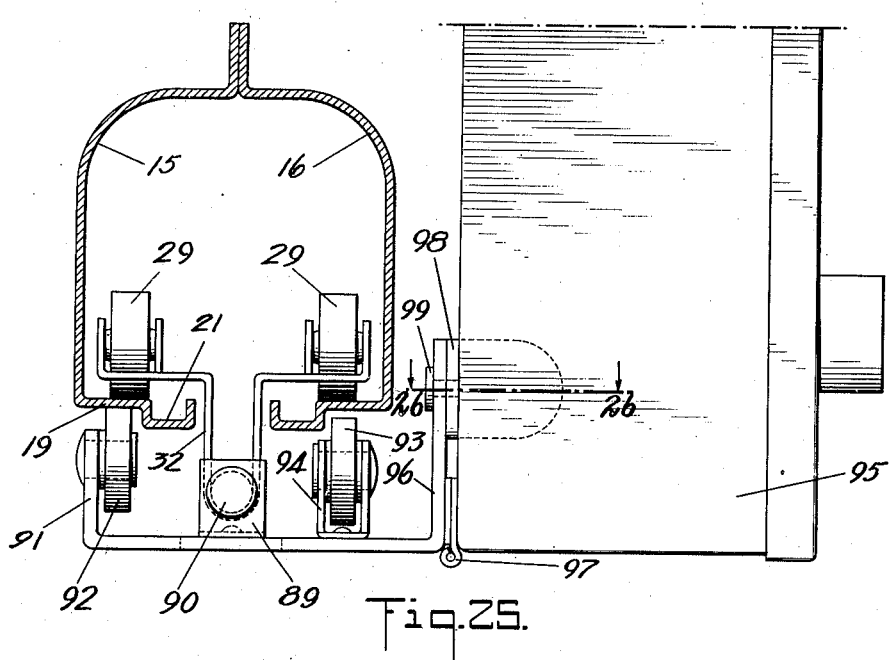

Patented Aug. 23, 1938

2,128,135

UNITED STATES PATENT OFFICE 2,128,135

ELECTRIC TROLLEY CONSTRUCTION

Ernest M. Glasgow, Towaco, N. J., assignor to Feedrail Corporation, New York, N. Y., a corporation of New York Application February 24, 1936, Serial No. 65,462

20 Claims. (Cl. 247—3)

This invention relates to electric trolley constructions of the type comprising bus bars and a carriage having contacts therefor, and more particularly to three phase installations of this character for distributing current to portable electric power tools.

This application is in part a continuation of my copending application Serial No. 53,075 filed December 5th, 1935, which in turn is in part a continuation of my application copending therewith, Serial No. 12,530 filed March 22nd, 1935, now Patent No. 2,026,884, Jan. 7, 1936.

One of the main objects of the present invention is to provide a polarized electric trolley construction, to prevent improper or reversed assembly thereof which would distribute current in reversed or improper phase relation.

Further objects are to provide improved joint and end constructions for the conduit, and to adapt the same for low level installations.

Another object is to provide an improved joint construction for the conduit to supply current to the bus bars thereof at a point intermediate the ends of the conduit, and to facilitate the connection of power leads thereto.

Other objects and features of novelty will be apparent as the following description proceeds, reference being had to the accompanying drawings, in which Figure 1 is a side elevation of the electric trolley construction according to the preferred embodiment of the present invention;

Figure 2 is an enlarged longitudinal vertical section through the construction shown in Figure 1;

Figure 3 is a longitudinal horizontal section taken along the line 3—3 of Figure 2, showing the carriage in plan;

Figure 4 is a vertical transverse section through the intermediate feed box, taken along the line 4—4 of Figure 1;

Figure 5 is a detail of the bus bar splice clip;

Figure 6 is a detail section taken along line 6—6 of Figure 2;

Figure 7 is a vertical transverse section through the conduit joint and hanger, taken along the line 7—7 of Figure 1;

Figure 8 is a section taken along the line 8—8 of Figure 1, showing the carriage door polarizing device and the structure for preventing closing the door when the carriage is reversed;

Figure 9 is a side elevation of the intermediate power feed bus bar joint structure;

Figure 10 is a section along line 10—10 of Figure 9.

Figure 11 is a section along line 11—11 of Figure 9;

Figure 12 is a detail perspective view of the conduit section polarization structure;

Figure 13 is an end view of the box for closing the dead end of the conduit;

Figure 14 is a side elevation of the same;

Figure 15 is a perspective detail of the arrangement for polarizing the carriage and its insulating base;

Figure 16 is an elevation of the conduit intermediate feed box structure;

Figure 17 is a plan of the same, with a coupling box applied to one side thereof;

Figure 18 is a section taken along the line 18—18 of Figure 16;

Figure 19 is a section taken along the line 19—19 of Figure 17;

Figure 20 is a side elevation of an end feed box;

Figure 21 is an end elevation of the same;

Figure 22 is a section taken along the line 22—22 of Figure 21;

Figure 23 is a section taken along the line 23—23 of Figure 24;

Figure 24 is a modification of Figure 21;

Figure 25 is an end elevation of an under carriage for a low level conduit shown in section;

Figure 26 is a plan of the under carriage, partly in section through the latch along the line 26—26 of Figure 25; and Figure 27 is an enlarged detail perspective view of the tongues on the coupling plate which interlock with the holes or slots in the section ends.

The electric trolley construction according to my copending applications hereinbefore referred to comprises an insulating member having bus bars secured thereto and complementary conduit members mounted at each side thereof, forming a conduit inclosing the bas bars, but spaced therefrom. The conduit also contains a carriage which moves longitudinally therein, and is provided with contacts engaging the bus bars. The conduit is manufactured in sections or units, which are adapted to be joined in end to end relation to form a continuous conduit of a length to suit the installation. Each section of the conduit is provided as shown in Figure 7 with an insulating member 2, the opposite sides and the edge of which have undercut grooves 3, 4 and 5. These grooves receive bus bars 6, 7 and 8 respectively, each comprising a strip of copper having its side edges bent back upon itself and brought together, and then both are flared outwardly forming diverging flanges 14. These flanges have a spring action which facilitates their longitudinal insertion and adjustment in the undercut grooves 3, 4 and 5. This also permits the bus bars to be adjusted longitudinally to take up variations in manufacture and assembly.

The margin of the insulating member 2 is secured between complementary conduit members 15 and 16, which have side walls parallel to the insulating member 2 and terminating in inwardly directed flanges 19. The inner edges of the flanges 19 are spaced apart thus leaving the trolley slot 20. The flanges 19 adjacent the slot 20 are provided with reinforcing grooves or channels 21.

Although the bus bars 6, 7 and 8 are preferably continuous from one end of the conduit unit to the other, the insulating member 2 is not necessarily continuous. At least two spaced insulating members are provided, between which conduit member flanges 18 are brought together and secured for example by spot welding. At the portions where the insulating member margin extends therebetween, the flanges 18 are bolted together therethrough.

The trolley carriage which operates in the conduit is described and claimed in my application Serial No. 53,075 hereinbefore mentioned. This carriage is provided with a pair of trolley contacts 26 and 27 which respectively engage the bus bars 6 and 7, and a trolley contact 28 which engages the bus bar 8. These contacts are journalled in arms 30 pivoted on an insulating plate 31 mounted on the carriage, which has supporting rollers 29 engaging the flanges 19, and guide rollers 25 engaging the sides of the slot 20. The sheet metal frame of the carriage has loops 32 joining floor flanges 33 from which side flanges 34 extend vertically. The loops 32 pivotally receive eyes 35 which suspend a control box which contains a switch, circuit breaker and/or fuses, and a receptacle for a plug to connect the power tool to be used.

To insure polarization of the successive conduit sections, and to prevent reversed assembly thereof, bars 36 are permanently secured in the grooves 21 at one end only of each conduit section as shown in Figure 12 by welding or riveting. The projecting ends of these bars 36 enter the mating ends of the grooves of the next section, and are tapped to receive screws through these grooves from the outside.

For joining the sections of the conduit, joint structure is provided as shown in Figures 2, 5 and 7. The bus bars are first spliced after which the section walls are coupled. The Bakelite bus bar support 2 terminates short of the ends of the conduit side members 15 and 16, but the ends of the bus bars project therefrom substantially to the ends of the side members, to meet when adjacent conduit sections are brought together. The divergent spring retaining flanges 14 of the bus bars are cut back from the ends, and channel clips 38 of the bus bar material receive the remaining portions of the bus bar ends, as shown in Figure 5, and are tapped to receive screws passing through the bus bar ends. One end of each clip 38 is secured to its bus bar end at the same end of the section where bars 36 occur, to prevent reversed assembly. For access to the clips 38 notches 39 are provided in each end of each of the side members 15 and 16.

For housing the bus bar joint, and coupling and supporting the conduit sections, complementary coupling members 40 are provided, which fit over and conform to the shape of the side members 15 and 16. The lower edges of these joint members have turned up tongues 41, the side edges of which are tapered or beveled at 41t (Fig. 27). These tongues enter slots 42 at the bottom of the side members 15 and 16 at the outer edges of the flanges 19 near each end of the section. Bolts 43 secure the coupling members 40 together at the top and also form a support for the conduit. It should be noted that these beveled tongues serve to wedge the sections toward each other, and thus insure abutting relationship thereof, and continuity of the longitudinal elements.

For supplying power at a point intermediate the ends of the conduit, the bus bar joint shown in Figures 2, 4 and 6 is employed. A block of insulation 44 has side grooves and a flat base to receive the splice clips 38 for the respective bus bars. The clip 38 for the bus bar 7 has an aperture through which passes a lug of a nut 45. This lug is in the form of a hollow rivet which is peened over or spread to secure the same to the clip. The nut 45 is inserted or embedded in the insulation, and receives the lower end of a terminal bolt 46 which extends vertically down thereto through the insulation, the threads being locked by a set screw. An identical terminal 47 for the bus bar 6 is provided at the other end of the block 44. The clip 38 for the bus bar 8 has an aperture which directly receives the reduced end of a terminal bolt 48 therefor extending down completely through the insulation. This reduced end is hollow riveted to secure the clip thereto.

A feed box is provided for housing this bus bar power supply joint. The coupling members 40 at this intermediate feed joint are cut down through the top curve. Part of the curve therebetween is cut away and the remainder flattened out as at 49, to receive the feed box, and the tops of the abutting section ends are cut away somewhat lower at 50. The feed box is formed by a plate of channel shape, the flanges 52 of which are notched, and the channel ends 54 folded down in inverted U-shape. Each leg 54 of this U-shape is cut to the contour of the conduit top, to receive the conduit members 15 and 16. The flanges 52 of these end legs 54 extend down for attachment to the flattened portions 49 of the coupling members 40. The box is completed by removable side plates 55 having offset lower edges 56 which hook inside the edges 49 and are secured to the flanges 52.

The top of the feed box receives the end of a pipe or other supply conduit 57 through which power leads 58 are respectively secured to the tops of the terminal bolts 46, 47 and 48 which serve as binding posts.

One of the conduit sections is provided with a door through which the trolley carriage may be inserted or applied. As shown in Figure 8 the lower portion 60 of each side member 15 and 16 is hinged at 61. This movable portion is somewhat longer than the trolley carriage, as shown in Figure 1. Opposed latch members 62 are mounted in the grooves 21 of the hinged portion 60, and are urged apart by springs 63.

The carriage is polarized in several particulars. The side flange 34 has a notch 64 cut therein to receive a projection 65 on the insulating base, as shown in Figure 15. The notch and projection are both offset from the center of length of the same, as shown in Figure 2. This arrangement prevents reversed assembly of the insulating base and the carriage frame.

One side flange 34 has at each end an ear 66 extending above the other side flange, which is adapted to engage an angle clip 67 secured to the inner side of the opposite wall 15 when the carriage is inserted in reversed position as shown in Figure 8. The angle clip is mounted at each side of the door opening as shown in Figure 1, and a similar angle clip 67 aligned therewith is secured to the inner side of one door 60. This clip prevents the door being closed on the carriage when it is in reversed position.

While certain of the sections may not be provided with doors, it is desirable to carry the polarization through such sections from door section to door section, and hence such sections each have the polarization tongues or bars 36. Furthermore, the provision of these tongues on such sections renders all of the sections interchangeable. Such sections are also preferably provided with angle clips near the ends thereof, to prevent endwise insertion of the carriage in reversed position.

A modified form of intermediate feed bus bar joint is shown in Figures 9, 10 and 11. A pair of short sections of the insulating block 2 are fitted with short sections of bus bars 6, 7 and 8 bridging the same. The attaching flanges 14 of these bus bar sections are cut back from the ends. Opposite sides of the ends of the blocks are notched at 68 to receive terminal straps 69 and 70 respectively brazed or sweated to the inner sides of the bus bars 6 and 7. A third strap 71 extends down between the blocks and is secured to the attaching flanges of the lower bus bar 8, by brazing or sweating. An insulating sleeve 72 is passed over the strap to insulate it from the bridging portions of the bars 6 and 7. The upper ends of the terminal straps 69, 70 and 71 are adapted to receive binding posts for the power leads 58.

Figure 9 also shows a modified splicing arrangement which may be used throughout in lieu of the splicing clip 38. The ends of the bus bars at one end of the section, after the flanges 14 are cut back, are offset as shown at 74, to receive the corresponding ends of the next section or a splice section. Screws pass through the overlapped ends into tapped holes in the offset ends, without requiring any coupling means separate from the bus bars.

The dead end of the conduit is closed by the dead end box shown in Figures 13 and 14. This box has an upper inner flange 75 cut to the contour of the conduit top, and a lower inner flange 76 which serves as a bumper for the trolley carriage. The end box is secured to the conduit by screws passing through projecting tongues 77 to the coupling member 40 and the side flanges 78 of the end box.

A modified intermediate feed box is shown in Figures 16, 17, 18 and 19. In this form the ends of the adjacent sections are not in abutting relationship, but instead are spaced apart. The joint members 40 are cut away in the center at the top, but the ends remain to join and support the sections as in the plain joint.

This box comprises end flanges 79 which are bent down and cut to conform to the conduit section, and side flanges 80 which form a bridge continuing the contour of the bottoms of the conduit sections. Thus the box forms track sections 19 which are provided with the polarization tongues 36 shown in Figure 12, which in addition to their usual functions, also hold down the box. Holes 81 are cut in the side flanges 80 and cover plates 82 are fitted thereover.

It should be noted that with both forms of feed box shown, the conduit sections can be joined and supported by the coupling members 40 before the box is inserted.

These views also show an arrangement for leading in power when lack of head room prevents access to the top. A coupling box 83 having inwardly flanged openings at each end is interposed between the cover plate and the side opening of the feed box. This coupling box has knockouts 84 in each side, for selective reception of the power lead conduit 57. A cover 85 is provided for the usual conduit opening.

An end feed box is shown in Figures 20, 21 and 22. This comprises a channel shape having notched flanges 52 to permit folding into U-shape. The bridge of the U has a central opening 86, both ends of which conform to the top of the conduit, thus rendering the box reversible. Projecting tongues 77 of the coupling members 40 are secured to the flanges 52 of the bridge. A flat U-shaped plate 87 is fitted over the other end and secured to the flanges of the legs of the U-shaped channel member.

In the modified form of Figures 23 and 24 the lower edge is flush with the bottom of the conduit, and hence to provide a bumper for the carriage, a tongue 88 is left projecting into the central opening.

The trolley construction including the conduit and the carriage, while adapted for overhead installation, is equally adapted for low level installation for example near the floor of the factory. When the level desired is too low to permit the control box to hang down, an under carriage is provided as shown in Figures 25 and 26.

Channel clips 89 are riveted to the under carriage and receive the loops 32, suitable pins 90 being passed therethrough. The inner upturned flange 91 carries journals for a pair of rollers 92, which engage the underside of the flanges or track portions 19. A steadying roller 93 is journaled in a bracket 94 riveted to the under carriage, in position to engage the underside of the other or opposite flange 19.

The ends of the loops 32 may be notched to receive the upstanding flanges of the clips 89, thus forming stops which prevent any pivoting about the pin 90. With this arrangement, the roller 29 above the roller 92 acts as a steadying roller, while the other roller 29 is the supporting roller.

The control box 95 is pivoted to the other upstanding flange 96 of the under carriage, by a hinge 97, and is held in the position shown, by a latch 98. This latch is slidably received to the control box, and has headed pins 99 entering the enlarged ends of keyhole shaped slots 100 in the flange 96.

This hinge and latch construction permits the control box 95 to be swung down, in removing the carriage from, or replacing the same in, the conduit in order to clear the door 60 shown in Figure 8, which of course is swung up to its widest open position for this purpose.

The coupling members 40, which have the tongues 41 entering the slots 42 at the outer edge of the flanges 19, are of particular advantage with this low level construction, because the lower side of the flange 19 is left clear of obstruction to the rollers 92.

The invention is not limited to the details disclosed, but includes such embodiments as fall within the scope of the following claims.

I claim:—

1. In an electric trolley construction, an elongated conduit section having a plurality of longitudinally parallel bus bars mounted therein and insulated therefrom, said conduit having a lateral opening for insertion of a carriage having contacts respectively adapted to engage said bus bars, a closure for said opening, and cooperating means on said closure and carriage for preventing closing of said closure when said carriage is inserted in reversed position.

2. In an electric trolley construction, an elongated conduit section having a plurality of longitudinally parallel bus bars mounted therein and insulated therefrom, a carriage mounted in said conduit for movement therelong, an insulating base mounted on said carriage and having contacts adapted to respectively engage said bus bars, and cooperating means on said carriage and base for preventing assembly of said insulating base on said carriage in reversed relation.

3. In an electric trolley construction, a pair of elongated conduit sections each having a longitudinal slot and a track portion on each side thereof and a plurality of longitudinally parallel bus bars mounted in said section and insulated therefrom, said pair of sections being arranged in end to end relation with the slots and track portions and bus bars thereof in alignment, means for respectively electrically connecting the aligned ends of said bus bars, and a section coupling overlapping adjacent aligned ends of said sections and secured thereto, said section coupling being secured to the side walls of said section ends outside of said track portions, thereby being clear of the underside of said track portions.

4. In an electric trolley construction, an elongated conduit section having a plurality of longitudinally parallel bus bars mounted therein and insulated therefrom and a longitudinal slot and track portions parallel thereto, said section having at one end a hanger comprising plates joined above the conduit section and extending down over the sides thereof and bent inward thereunder, and an end closure for said section secured in position adjacent to said hanger and forming a hollow structure defining a chamber in communication with the interior of said conduit, said hollow structure terminating said track portions and said end closure having flange means terminating said slot within the section and having an end wall closing said interior beyond the ends of the bus bars of said section, thereby forming a terminal section for installation at the end of the conduit, said bus bar ends being provided with means for connecting power lead in wires thereto, and said hollow structure being provided with an opening through which said power lead in wires may enter for connection to said connecting means.

5. In an electric trolley construction, an elongated conduit section having a plurality of longitudinally parallel bus bars mounted therein and insulated therefrom, a box-like structure joined to the end of said conduit section with their interiors in communication, said box-like structure comprising a plate channel shaped in transverse section with the whole bent into a channel in longitudinal section, whereby its inturned flanges substantially define parallel planes, and cover plates overlapping and secured to said flanges for closing the remaining openings of said box-like structure.

6. In an electric trolley construction, a conduit section having a plurality of longitudinally parallel bus bars mounted therein and insulated therefrom and provided with a longitudinal slot and track portions parallel thereto, a carriage movable along said track portions and having contacts respectively engaging said bus bars and a portion depending through said slot, a control box at one side of said conduit and extending above the level of the bottom thereof, and an under carriage secured to the depending portion of said carriage for supporting said control box and having a roller engaging the underside of the track portion remote from said control box.

7. In an electric trolley construction, a conduit section having a plurality of longitudinally parallel bus bars mounted therein and insulated therefrom and provided with a longitudinal slot and track portions parallel thereto, a carriage movable along said track portions and having contacts respectively engaging said bus bars, a control box connected to said carriage by insulated conductors through said slot, means for supporting said control box at one side of said conduit, said conduit section having a door comprising a hinged portion of one of said tracks adapted to swing open to admit said carriage, and said supporting means comprising a hinge constructed and arranged to permit said control box to swing clear of said door.

8. In an electric trolley construction, a current supply conduit section comprising a plurality of longitudinally parallel bus bars and means for supporting said bus bars insulated from said section and from each other with the exposed faces of two facing in opposite directions and the exposed face of another facing in a different direction, said section having inturned horizontal flanges forming track portions below said bus bars and spaced apart to form a slot, one end of said section being adapted to be butted against an adjacent end of a similar section and provided with means for preventing the adjacent section from being assembled therewith in reversed relation, coupling means extending over the outside of the said abutting ends for supporting and joining the same, means within said coupling means for joining the bus bar ends and constructed and arranged to provide smooth continuity of the exposed faces thereof from one section to the other, the conduit joint being constructed and arranged to provide smooth continuity of said track portions and said slot from one section to the other, whereby current may be continuously taken off through said slot from a carriage supported on and moving along said track portions and having contacts engaging said bus bars passing within the conduit from one section to the other.

9. In an electric trolley construction, a current supply conduit section comprising a plurality of longitudinally parallel bus bars and means for supporting said bus bars insulated from said section and from each other, said section having inturned horizontal flanges forming track portions below said bus bars and spaced apart to form a slot, said track portions having an access opening cut therethrough to permit insertion of a carriage having contacts for engaging said bus bars and supporting wheels or rollers for riding on said track portions, the remaining side walls having holes adjacent the lower edges thereof which were formed by the cut, doors having tongues passing through said holes and curled over pivot means at said lower edges of said side walls, and means for latching said doors in position aligned with said track portions.

10. In an electric trolleys construction, an elongated sheet metal casing having in the bottom thereof a longitudinal slot and track portions parallel thereto, the entire wall of said casing being symmetrical about a vertical plane through said slot, means for supporting a plurality of longitudinally parallel bus bars inside said casing and insulated therefrom, one end of said casing being adapted to be aligned and assembled with the adjacent end of a similar casing whereby the bus bars thereof may be joined for distributing current therethrough, polarizing means on said casing end for preventing the adjacent casing from being assembled therewith in reversed relation, and a coupling plate overlapping the outside of both of said aligned casing ends in metal to metal contact therewith, said polarizing means and said coupling plate both preserving the symmetry of the adjacent ends of the sheet material.

11. In an electric trolley construction, an elongated conduit section comprising a sheet metal casing having vertical side walls with inturned bottom flanges spaced apart to leave a longitudinal slot therebetween, said casing having longitudinally extending bus bars mounted therein and insulated therefrom for supplying current to a carriage having contacts respectively urged into engagement with said bus bars and having supporting rollers for rolling along said flanges, one of said bus bars having its exposed contact surface facing downwardly toward said slot, and the remaining bus bars having contact surfaces perpendicular thereto, said casing being constructed and arranged for the insertion of said carriage thereinto through openings in said flanges, and for the movement of said carriage along on said flanges only when said carriage is not in reversed position, the ends of said casing being symmetrical about a vertical plane through said slot and provided with means for preventing said section from being assembled with the adjacent section in reversed position.

12. In an electric trolley construction, an elongated casing of sheet material having in the bottom thereof a longitudinal slot and track portions parallel thereto, means for supporting a plurality of longitudinally parallel bus bars inside said casing and insulated therefrom, one end of said casing being adapted to be aligned and assembled with the adjacent end of a similar section whereby the bus bars thereof may be joined for distributing current therethrough, and polarizing means secured to said end between said slot and the adjacent track portion.

13. In an electric trolley construction, a pair of elongated conduit sections each having a plurality of longitudinally parallel bus bars mounted therein and insulated therefrom, and each provided with a longitudinal slot and track portions parallel thereto, said pair of sections being arranged in end to end relation with the bus bars, slots and track portions thereof in alignment, means for joining the adjacent ends of said conduit sections, and means within said section joining means and carried by a common insulating structure insertable between said section ends as a unit for joining the aligned bus bar ends, and means passing through said conduit joining means for supplying current to the joining means for each of said bus bars carried by said common insulating structure.

14. In an electric trolley construction, an elongated conduit section having a plurality of longitudinally parallel bus bars mounted therein and insulated therefrom and a longitudinal slot and track portions parallel thereto, said section having at one end a hollow structure defining a chamber in communication with the interior of said conduit, said hollow structure having flange means terminating said slot and said track portions and having an end wall transverse to said conduit and closing said interior beyond the ends of the bus bars of said conduit, thereby forming a terminal section for installation at the ends of said conduit, said flange means being spaced inward from said end wall and serving for bumper purposes in stopping a trolley in said conduit.

15. In an electric trolley construction, a current supply section comprising a plurality of longitudinally parallel bus bars and means for supporting said bus bars insulated from each other, said section having inturned horizontal flanges forming track portions below said bus bars and spaced apart to form a slot, said track portions having an access opening cut therethrough to permit insertion of a carriage having contacts for engaging said bus bars and supporting wheels or rollers for riding on said track portions, doors forming replacement track portions for said access opening, and latching means on said doors engaging and cooperating with the remaining parts of said track portions for retaining said doors in position and to support said trolley thereon from said track portions, said means being releasable to permit opening of said doors, said latching means transmitting part of the weight of the carriage on said doors to said track portions.

16. In an electric trolley construction, an elongated conduit section having a longitudinal slot and a track portion on each side thereof and a plurality of longitudinally parallel bus bars mounted therein and insulated therefrom, an end box secured at the end of said section and defining a chamber in communication with the interior of said conduit, said box having an end wall closing said interior beyond the ends of said bus bars, and means for terminating said slot, terminal posts respectively secured to said bus bars and projecting away from their contact surfaces and into said chamber defined by the end box, said end box having an opening in one of its faces, and power lead in conductors passing through said opening from the outside and respectively secured to said terminal posts.

17. In an electric trolley construction, a pair of aligned slotted track forming conduit sections containing insulated bus bars joined end to end, a section coupling overlapping adjacent ends of said sections and having inturned portions passing under said section ends and supporting the same thereon, said inturned portions and the section parts engaged thereby having rigid tongues on the one registering with slots in the other, said tongues being caused to enter said slots by gravity action during assembly, and screw means passing through the upper part of said section coupling for clamping said section ends therein and retaining said tongues in said slots.

18. In an electric trolley construction, a pair of aligned slotted track forming conduit sections containing insulated bus bars joined end to end, a hanger comprising side plates overlapping adjacent ends of said sections, portions of said side plates being cut away and said hanger having a top opening, and a hanger cover comprising a flat top cover plate overlying the top opening of said hanger, and side cover plate portions cooperating therewith and overlying the cut away portions of the hanger side plates, said side cover plate portions being substantially flat and thereby free of lateral projections.

19. In an electric trolley construction, an elongated sheet metal casing having longitudinally parallel bus bars mounted therein and insulated therefrom, said casing having inturned horizontal flanges forming track portions below said bus bars and spaced apart to form a slot, opposite portions of said flanges being cut away to form a carriage entrance opening extending across the bottom of said casing, doors replacing the cut away portions and directly pivoted to the lower margins of the side walls which were formed by the cut whereby said doors may be swung downwardly to admit the carriage, and cooperating means on said doors and the lower portions of said casing for retaining said doors in replacement position and accessible from the bottom or side of said casing for releasing said doors.

20. In an electric trolley construction, a pair of aligned slotted track forming conduit sections containing insulated bus bars, one bus bar end of each section being offset away from its contact surface to receive the other bus bar end, and screws passing through longitudinally spaced holes in one of said ends into registering tapped holes in the other for joining the same without requiring any bus bar coupling means separate from the bus bars, and a hanger comprising coupling plates having imperforate sides overlapping adjacent ends of said sections and having inturned portions passing under said section ends and supporting the same thereon, said inturned portions and the section parts engaged thereby having rigid tongues on the one registering with slots on the other, said coupling plates conforming to the cross-section of said section ends and said imperforate sides forming the sole covering for the bus bar joints, the tops of said coupling plates being connected to hold said imperforate sides flat against the sides of the conduit ends.

ERNEST M. GLASGOW.